(12) United States Patent
Ishii (10) Patent No.: US 8,648,933 B2
(45) Date of Patent: Feb. 11, 2014

(54) IMAGE SENSING APPARATUS AND METHOD FOR CONTROLLING THE SAME

(75) Inventor: Akiyoshi Ishii, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 302 days.

(21) Appl. No.: 13/139,054

(22) PCT Filed: Nov. 9, 2009

(86) PCT No.: PCT/JP2009/069409
§ 371 (c)(1),
(2), (4) Date: Jun. 10, 2011

(87) PCT Pub. No.: WO2010/067692
PCT Pub. Date: Jun. 17, 2010

(65) Prior Publication Data
US 2011/0249147 A1  Oct. 13, 2011

(30) Foreign Application Priority Data
Dec. 12, 2008  (JP) ................................ 2008-317707

(51) Int. Cl.
*H04N 5/76* (2006.01)

(52) U.S. Cl.
USPC .................................. 348/231.99; 348/231.3

(58) Field of Classification Search
USPC ........................................ 348/231.99–231.9
See application file for complete search history.

(56) References Cited

U.S. PATENT DOCUMENTS

| 2003/0014475 A1* | 1/2003 | Komori ......................... 709/200 |
| 2007/0035632 A1* | 2/2007 | Silvernail et al. .......... 348/211.3 |
| 2009/0219639 A1* | 9/2009 | Marman et al. ................. 360/69 |

FOREIGN PATENT DOCUMENTS

| CN | 1407553 A | 4/2003 |
| JP | 07-284058 A | 10/1995 |
| JP | 2004-180191 A | 6/2004 |
| JP | 2005-020484 A | 1/2005 |
| JP | 2006-298324 A | 11/2006 |
| JP | 2007-259390 A | 10/2007 |
| JP | 2008-219275 A | 9/2008 |

OTHER PUBLICATIONS

Chinese Office Action issued in corresponding application No. 200980150112.2 on Mar. 11, 2013.

* cited by examiner

*Primary Examiner* — Sinh Tran
*Assistant Examiner* — Christopher K Peterson
(74) *Attorney, Agent, or Firm* — Carter, DeLuca, Farrell & Schmidt LLP

(57) ABSTRACT

The present invention provides an image sensing apparatus including an encoding unit for converting video from an image sensing unit so as to generate stream data, and store the stream data in a buffer unit, a control unit for controlling the encoding unit, in a case where, in a fixed time recording mode for recording for a fixed time in response to an instruction to start recording, a second instruction to start recording is issued before the fixed time has elapsed since a first instruction to start recording was issued, to store in the buffer unit stream data that lasts for the fixed time corresponding to the first instruction to start recording, and stream data that lasts for the fixed time corresponding to the second instruction to start recording, and a recording unit for recording each piece of stream data stored in the buffer unit on a recording medium.

5 Claims, 9 Drawing Sheets

IMAGE SENSING APPARATUS AND METHOD FOR CONTROLLING THE SAME

TECHNICAL FIELD

The present invention relates to an image sensing apparatus and a method for controlling the same.

BACKGROUND ART

Digital video cameras (hereinafter, referred to as "DVC"s) that use a recording medium that can be randomly accessed, such as an optical disc, a hard disk drive, and a flash memory, are becoming widespread as image sensing apparatuses that record moving images. Further, digital still cameras serving as image sensing apparatuses that record still images (hereinafter, referred to as "DSC"s) with a function for recording moving images have become common.

Such an image sensing apparatus has the feature that a recorded moving image (or still image) can be randomly accessed, and that it is highly compatible with other processing apparatuses such as a personal computer (PC). In recent years, using such a feature, it is normal to create a moving image file (snap movie) that lasts for a short time from the moving image recorded with the image sensing apparatus, attach the created file to an electronic mail or the like and transmit or release the created file to the public on a Web page.

In view of this, Japanese Patent Laid-Open No. 2005-20484 and Japanese Patent Laid-Open No. 2007-259390 propose an image sensing apparatus in which a normal recording mode for continuously recording in response to a user instruction as much as the capacity of a recording medium allows or a fixed time recording mode for automatically recording for only a fixed time (for example, 5 seconds or 10 seconds) can be selected. With such an image sensing apparatus, a snap movie can be easily created by selecting the fixed time recording mode.

However, according to Japanese Patent Laid-Open No. 2005-20484, once recording is started in the fixed time recording mode, it is only possible to wait until recording is stopped after a fixed period elapses, or discontinue recording before a fixed period elapses. Therefore, if a more impressive scene appears before a fixed time elapses, that is, if periods that are to be recorded as videos overlap, there is a possibility that a desired video cannot be recorded.

On the other hand, Japanese Patent Laid-Open No. 2007-259390 discloses a technique for independently extracting each video if the periods that are to be recorded as videos overlap in the fixed time recording mode. However, according to Japanese Patent Laid-Open No. 2007-259390, if the periods that are to be recorded as videos overlap, since one of or both of the videos are cut off so as not to have an overlapping portion, there are cases in which a video may not be recorded during the period expected by the user.

DISCLOSURE OF INVENTION

The present invention provides a technique with which videos that last for a fixed period corresponding to each instruction to start recording can be recorded even in a case in which an instruction to start recording is issued before a fixed time elapses since an instruction to start recording was issued, in a fixed time recording mode.

According to one aspect of the present invention, there is provided an image sensing apparatus comprising: an encoding unit configured to convert video from an image sensing unit so as to generate stream data, and store the stream data in a buffer unit; a control unit configured to control the encoding unit, in a case where, in a fixed time recording mode for recording for a fixed time in response to an instruction to start recording, a second instruction to start recording is issued before the fixed time has elapsed since a first instruction to start recording was issued, to store in the buffer unit stream data that lasts for the fixed time corresponding to the first instruction to start recording, and stream data that lasts for the fixed time corresponding to the second instruction to start recording; and a recording unit configured to record each piece of stream data stored in the buffer unit on a recording medium.

Further aspects of the present invention will become apparent from the following description of exemplary embodiments with reference to the attached drawings.

BEST MODE FOR CARRYING OUT THE INVENTION

Preferred embodiments of the present invention will be described below with reference to the accompanying drawings. Note that the same reference numerals denote the same members throughout the drawings, and a repetitive description thereof will not be given.

First Embodiment

Figure 1:
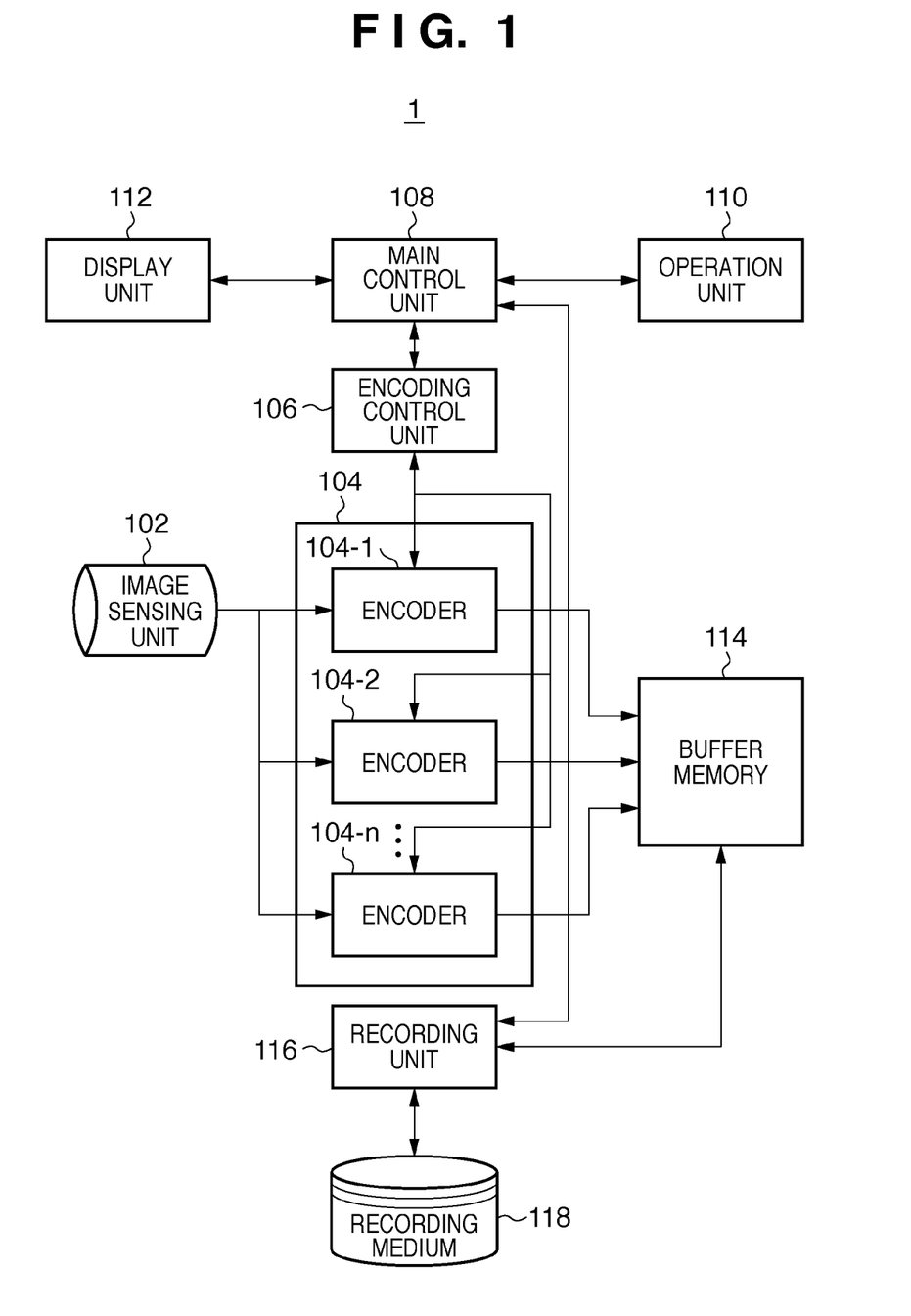
FIG. 1 is a schematic block diagram showing the configuration of an image sensing apparatus according to a first embodiment of the present invention.

FIG. 1 is a schematic block diagram showing the configuration of an image sensing apparatus 1 according to a first embodiment of the present invention. The image sensing apparatus 1 is an image sensing apparatus that converts a video of an object into stream data and records the stream data on a recording medium, and is realized by a digital video camera or a digital still camera, for example. Further, the image sensing apparatus 1 can also reproduce a video recorded on the recording medium. With the image sensing apparatus 1, it is possible to select, as a recording mode, a normal recording mode for continuously recording as much as the capacity of the recording medium allows in response to a user instruction, or a fixed time recording mode for recording for a fixed time from when a user issues an instruction to start recording. Note that the user can arbitrarily set the fixed time for which recording is performed in the fixed time recording mode (for example, five seconds or ten seconds).

The image sensing apparatus 1 is provided with an image sensing unit 102, an encoding unit 104, an encoding control unit 106, a main control unit 108, an operation unit 110, a display unit 112, a buffer memory 114, a recording unit 116, and a recording medium 118.

The image sensing unit 102 includes an imaging lens, an image sensor, and the like, forms an optical image of an object, and also performs photoelectric conversion on that optical image so as to generate a video signal. The video signal generated by the image sensing unit 102 is output to the encoding unit 104 via a video signal processing unit (not shown).

The encoding unit 104 converts the video signal input from the image sensing unit 102 so as to generate stream data, and stores that stream data in the buffer memory 114. In the present embodiment, the encoding unit 104 is constituted from a plurality of encoders 104-1, 104-2, ..., 104-n that perform a converting process for converting a video into stream data. The plurality of encoders 104-1 to 104-n are controlled by the encoding control unit 106, and convert a video signal input from the image sensing unit 102 into stream data in a predetermined format.

The encoding control unit 106 controls the encoding unit 104. Specifically, under the control of the main control unit 108, the encoding control unit 106 controls a converting process performed by the plurality of encoders 104-1 to 104-n that constitute the encoding unit 104 (that is, the operation timing of the plurality of encoders 104-1 to 104-n).

The main control unit 108 performs overall control of the entire image sensing apparatus 1 (operations). In the present embodiment, the main control unit 108 controls the encoding control unit 106 according to an operation performed by the image sensing apparatus 1. The main control unit 108 is connected to the operation unit 110 for the user to operate the image sensing apparatus 1, and controls according to the user operating the operation unit 110. In addition, the main control unit 108 is also connected to the display unit 112 for displaying the state of the image sensing apparatus 1 and the like, and causes the display unit 112 to display a captured video, a reproduced image, a message to the user, or the like, when necessary. Note that the operation unit 110 includes various kinds of operation buttons and a touch panel provided to the display unit 112 that receive an operation (instruction) from the user, for example. In the present embodiment, a selection between the normal recording mode and the fixed time recording mode, an instruction to start recording, and the like are input into the main control unit 108 via the operation unit 110. Further, the display unit 112 is constituted from a display element such as an LCD.

The buffer memory 114 is a memory that temporarily stores stream data generated by the encoding unit 104 (encoders 104-1, 104-2, ..., 104-n).

The recording unit 116 is connected to the buffer memory 114 and the recording medium 118. The recording unit 116 regularly monitors the state of the buffer memory 114, and records stream data stored in the buffer memory 114 on the recording medium 118.

The recording medium 118 is provided so as to be attachable to and removable from the image sensing apparatus 1. The recording medium 118 is constituted from a recording medium that can be randomly accessed, such as an optical disc, a hard disk drive, or a flash memory, for example, and records stream data stored in the buffer memory 114 as a file.

Note that in the image sensing apparatus 1 shown in FIG. 1, some or all of the encoding unit 104, the encoding control unit 106, the main control unit 108, and the recording unit 116 may be realized as a program on a CPU mounted in the image sensing apparatus 1.

Here, with the image sensing apparatus 1, while the fixed time recording mode is selected, there are cases in which a second instruction to start recording is issued before a fixed time has elapsed since a first instruction to start recording was issued. In such a case, the encoding control unit 106 and the main control unit 108 control the encoding unit 104 to independently store, in the buffer memory 114, pieces of stream data that last for a fixed time corresponding to each of the first instruction to start recording and the second instruction to start recording. Specifically, the encoding control unit 106 and the main control unit 108 control an operation timing of the plurality of encoders 104-1 to 104-n such that the plurality of encoders 104-1 to 104-n independently generate pieces of stream data that last for a fixed time corresponding to each of the first instruction to start recording and the second instruction to start recording. The encoding unit 104 stores, in the buffer memory 114, the pieces of stream data independently generated by the plurality of encoders 104-1 to 104-n. Then, the recording unit 116 records each piece of the stream data independently stored in the buffer memory 114 on the recording medium 118.

Figure 2:
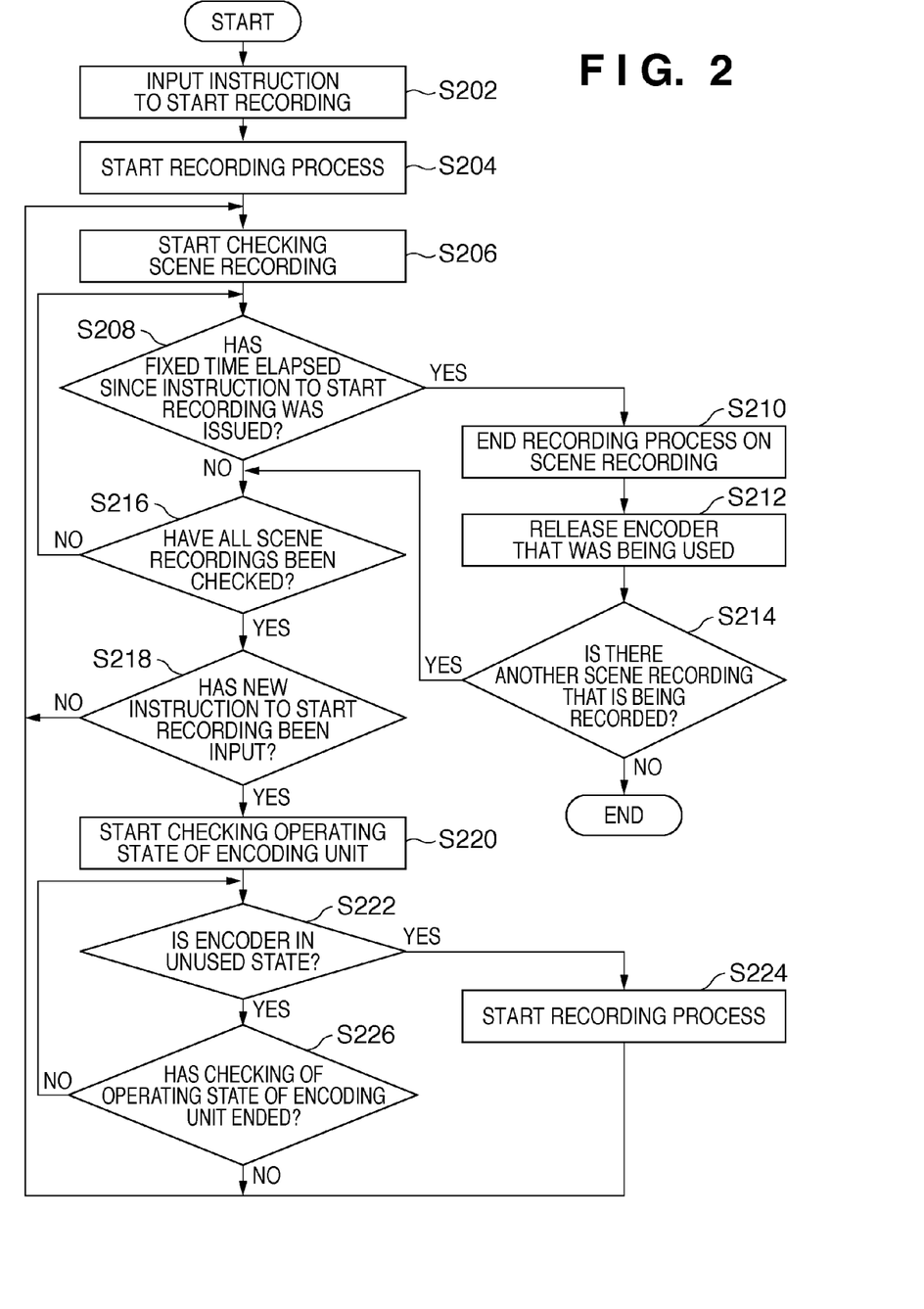
FIG. 2 is a flow chart for illustrating an operation performed by the image sensing apparatus shown in FIG. 1 in a fixed time recording mode.

Hereinafter, operations performed by the image sensing apparatus 1 are described with reference to FIG. 2. Here, an operation in the fixed time recording mode is described from among the entire operations performed by the image sensing apparatus 1. This operation is executed by the fixed time recording mode being selected as a recording mode of the image sensing apparatus 1, and the main control unit 108 performing overall control of each unit of the image sensing apparatus 1.

In step S202, the operation unit 110 receives an instruction to start recording from the user, and this instruction to start recording is input into the main control unit 108 via the operation unit 110.

In step S204, the main control unit 108 causes the encoding unit 104 to start a recording process via the encoding control unit 106 in response to the instruction to start recording from the user. Specifically, the main control unit 108 issues an instruction to the first encoder 104-1 of the encoding unit 104 to perform a converting process for converting a video signal input from the image sensing unit 102 into stream data. Note that the stream data converted by the encoding unit 104 is successively stored in the buffer memory 114.

In step S206, the main control unit 108 starts checking a scene recording that is being currently recorded in response to the instruction to start recording from the user. At this time, the main control unit 108 starts checking from the scene recording for which the instruction to start recording was issued at the earliest time. Note that only one scene recording is recorded at the stage when an instruction to start recording has been issued in a state in which an instruction to start recording was not issued (that is, recording was stopped).

In step S208, the main control unit 108 determines whether a fixed time has elapsed since the instruction to start recording was issued for the scene recording targeted for checking. If the fixed time has not elapsed since the instruction to start recording was issued, checking of a scene recording targeted for checking ends, and the processing proceeds to step S216. On the other hand, if the fixed time has elapsed since the instruction to start recording was issued, the processing proceeds to step S210.

In step S210, the main control unit 108 ends a recording process on the scene recording targeted for checking. Specifically, via the encoding control unit 106, the main control unit 108 issues an instruction to the encoder that is being used for the scene recording targeted for checking to stop a converting process. Then, the main control unit 108 issues an instruction to the recording unit 116 to record stream data of the scene recording targeted for checking stored in the buffer memory 114, on the recording medium 118.

In step S212, via the encoding control unit 106, the main control unit 108 releases the encoder that was being used for the scene recording targeted for checking in the encoding unit 104, and puts the encoder into an unused state.

In step S214, the main control unit 108 determines whether there is another scene recording that is being currently recorded. If there is no other scene recording that is being currently recorded, all the scene recordings have ended and, thus, the operation ends. On the other hand, if there is another scene recording that is being currently recorded, the processing proceeds to step S216 in order to continue checking other scene recordings.

In step S216, the main control unit 108 determines whether all the scene recordings that are being currently recorded have been checked. As described above, since scene recordings are checked from the scene recording for which the instruction to start recording was issued at the earliest time and, thus, it is sufficient that the main control unit 108 determines whether the scene recording for which the instruction to start recording was issued at the latest time has been checked. If all the scene recordings have not been checked, the processing returns to step S208 in order to check the next scene recording. On the other hand, if all the scene recordings have been checked, the processing proceeds to step S218.

In step S218, the main control unit 108 determines whether the operation unit 110 has received a new instruction to start recording from the user, and the new instruction to start recording has been input. If a new instruction to start recording is not input, the processing returns to step S206, and checking of a scene recording that is being currently recorded is started. If a new instruction to start recording has been input, the processing proceeds to step S220.

In step S220, the main control unit 108 starts checking the operating state of the encoding unit 104 via the encoding control unit 106. Here, checking of the operating state of the encoding unit 104 is to check whether an encoder of the encoding unit 104 is in an unused state (that is, whether or not an encoder is performing a converting process), and the encoders are checked in order from the first encoder 104-1 of the encoding unit 104.

In step S222, the main control unit 108 determines whether the encoder targeted for checking is in an unused state (or is in a used state). If the encoder targeted for checking is in an unused state, the processing proceeds to step S224. On the other hand, if the encoder targeted for checking is not in an unused state (that is, in a used state), checking of the encoder targeted for checking ends, and the processing proceeds to step S226.

In step S224, via the encoding control unit 106, the main control unit 108 causes an encoder determined as being in an unused state in step S222 to start a recording process. Specifically, the main control unit 108 issues an instruction to the encoder determined as being in an unused state in step S222 to perform a converting process for converting a video signal input from the image sensing unit 102 into stream data. Accordingly, the stream data that lasts for the fixed time corresponding to the new instruction to start recording will be stored in the buffer memory 114. Note that after causing the encoder determined as being in an unused state in step S222 to start a recording process, the processing returns to step S206 in order to start checking a scene recording.

In step S226, the main control unit 108 determines whether checking of the operating state of the encoding unit 104 has ended (that is, whether the main control unit 108 has checked all the encoders of the encoding unit 104 to determine if an encoder is in an unused state). If checking of the operating state of the encoding unit 104 has not ended, the processing returns to step S222 in order to check the next encoder. On the other hand, if checking of the operating state of the encoding unit 104 has ended, the processing returns to step S206, and checking of a scene recording that is being currently recorded is started. At this time, the main control unit 108 may cancel a new instruction to start recording input from the operation unit 110, and may cause the display unit 112 to display a message indicating that a recording could not be started. This enables the user to know that a recording process corresponding to the new instruction to start recording is not performed since all the encoders of the encoding unit 104 were in a used state. Also, the main control unit 108 may suspend a new instruction to start recording until it is determined whether a next instruction to start recording has been input (step S218). Accordingly, after the checking of scene recordings has ended, checking of the operating state of the encoding unit 104 will be started again, and a recording process can be automatically started if any one of the encoders enters an unused state.

Further, after ending all of the recording processes corresponding to instructions to start recording, the main control unit 108 may display, on the display unit 112, a list of a plurality of pieces of stream data recorded on the recording medium 118 in a selectable manner, and may delete stream data selected by the user. Accordingly, it is possible to confirm stream data recorded on the recording medium 118, and to delete unnecessary stream data and, thus, the capacity of the recording medium 118 can be efficiently used. Note that the recording unit 116 deletes stream data recorded on the recording medium 118 under the control of the main control unit 108.

Figure 3A:
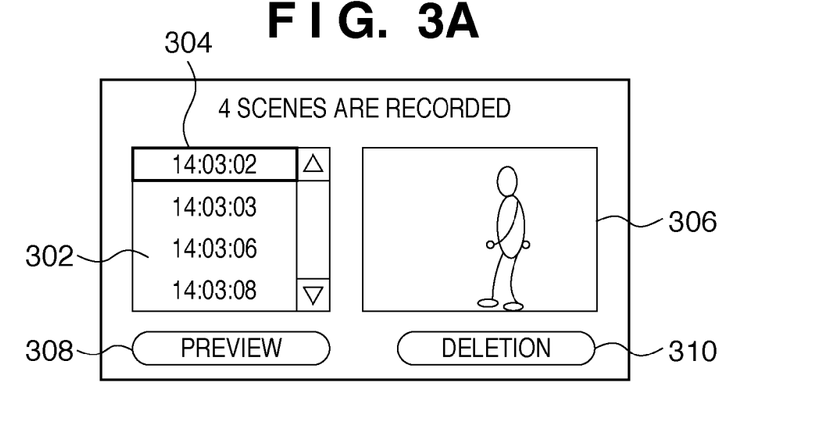
FIG. 3A to FIG. 3C are diagrams showing example display screens, of the image sensing apparatus shown in FIG. 1, displayed on a display unit when stream data selected by a user is deleted from among a plurality of pieces of stream data recorded on a recording medium.
Figure 3B:
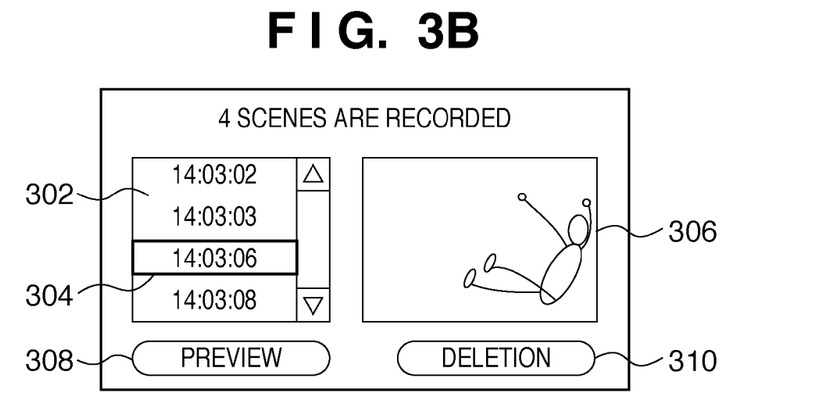
Figure 3C:
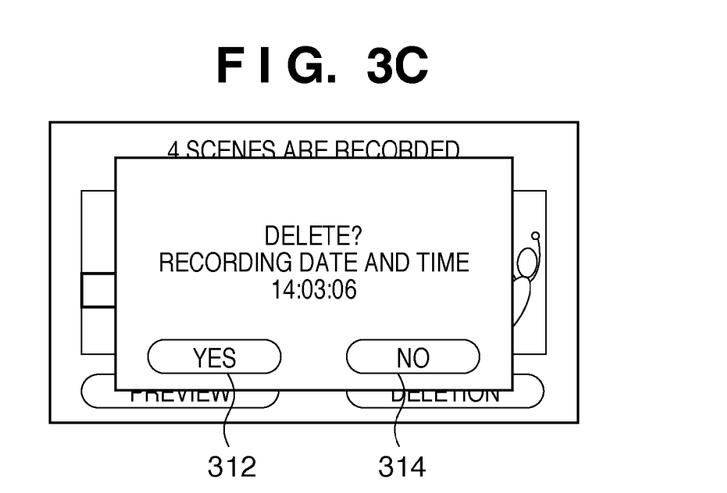

FIG. 3A to FIG. 3C are diagrams showing example display screens displayed on the display unit 112 when stream data selected by the user is deleted from among a plurality of pieces of stream data recorded on the recording medium 118. Stream data recorded on the recording medium 118 is displayed in a stream-data display portion 302 in an identifiable manner, and the time at which a recording of stream data was started is displayed in the present embodiment. A cursor 304 is a cursor for selecting stream data displayed in the stream-data display portion 302. The user can select stream data displayed in the stream-data display portion 302 by moving the cursor 304 via the operation unit 110. Note that the first image of the stream data (video) selected with the cursor 304 is displayed in an image display portion 306. As shown in FIG. 3A and FIG. 3B, in a state in which stream data that started to be recorded at the time 14:03:02 is selected, if the cursor 304 is moved so as to select stream data that started to be recorded at the time 14:03:06, the image displayed in the image display portion 306 is switched. Further, if a "preview" button 308 is selected, the preview of stream data selected with the cursor 304 is displayed in the image display portion 306. Further, if a "deletion" button 310 is selected, as shown in FIG. 3C, a display screen for confirming whether to delete the stream data selected with the cursor 304 is displayed. In the display screen shown in FIG. 3C, if a "yes" button 312 is selected, the stream data selected with the cursor 304 is deleted from the recording medium 118. On the other hand, if a "no" button 314 is selected in the display screen shown in FIG. 3C, deletion of the stream data selected with the cursor 304 is canceled, and the display screen returns to the display screen shown in FIG. 3A or FIG. 3B.

Figure 4:
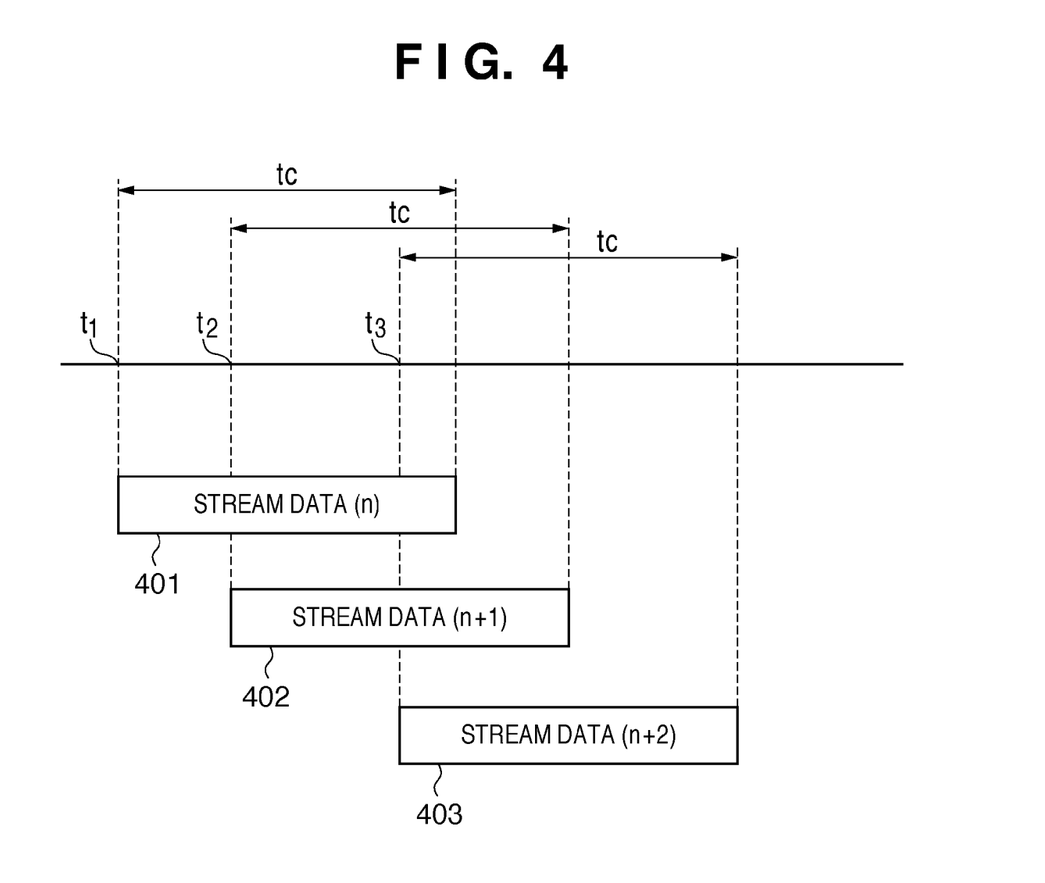
FIG. 4 is a timing chart showing recording states of pieces of stream data corresponding to each instruction to start recording if a plurality of instructions to start recording are issued before a fixed time has elapsed since an arbitrary instruction to start recording was issued in the fixed time recording mode of the image sensing apparatus shown in FIG. 1.

FIG. 4 is a timing chart showing the recording states of pieces of stream data corresponding to each instruction to start recording if a plurality of instructions to start recording are issued before a fixed time elapses since an arbitrary instruction to start recording was issued, in the fixed time recording mode of the image sensing apparatus 1.

Referring to FIG. 4, if an instruction to start recording from the user is input at a time t1 in a state in which a scene recording is not being recorded, the encoder 104-1 of the encoding unit 104 performs a converting process (a process for converting a video signal from the image sensing unit 102 into stream data). The stream data converted (generated) by the encoder 104-1 is temporarily held as stream data 401 in the buffer memory 114, and is recorded on the recording medium 118 via the recording unit 116. Here, if n−1 pieces of stream data are recorded before the time t1, the stream data 401 is the n-th stream data. Note that the converting process performed by the encoder 104-1 and started in response to an instruction to start recording issued at the time t1 ends after a fixed time tc has elapsed after the time t1, in response to an instruction from the main control unit 108.

Next, if a new instruction to start a recording from the user is input at a time t2 between the time t1 and a time t1+tc, the encoder 104-1 is already performing a converting process (is in a used state) and, accordingly, the next encoder 104-2 in an unused state performs a converting process. The stream data converted (generated) by the encoder 104-2 is temporarily held as stream data 402 in the buffer memory 114, and is recorded on the recording medium 118 via the recording unit 116. The stream data 402 is the n+1-th stream data. Note that the converting process performed by the encoder 104-2 and started in response to the instruction to start recording issued at the time t2 ends after the fixed time tc has elapsed after the time t2, in response to an instruction from the main control unit 108.

Furthermore, if a new instruction to start recording from the user is input at a time t3 between the time t2 and a time t2+tc, the encoders 104-1 and 104-2 are already performing a converting process and, accordingly, the next encoder 104-3 in an unused state performs a converting process. The stream data converted (generated) by the encoder 104-3 is temporarily held as stream data 403 in the buffer memory 114, and is recorded on the recording medium 118 via the recording unit 116. The stream data 403 is the n+2-th stream data. Note that the converting process performed by the encoder 104-3 and started in response to the instruction to start recording issued at the time t3 ends after the fixed time tc has elapsed after the time t3, in response to an instruction from the main control unit 108.

In this way, according to the image sensing apparatus 1, even if a new instruction to start recording is issued before a fixed time has elapsed since an instruction to start recording was issued in the fixed time recording mode, it is possible to independently record videos that last for a fixed period corresponding to each instruction to start recording. Therefore, even in a case in which the periods that are to be recorded as videos overlap, the user can record without missing a desired video. Further, since the recorded video lasts for a fixed time, the workload when editing such a video can be reduced.

Second Embodiment

Figure 5:
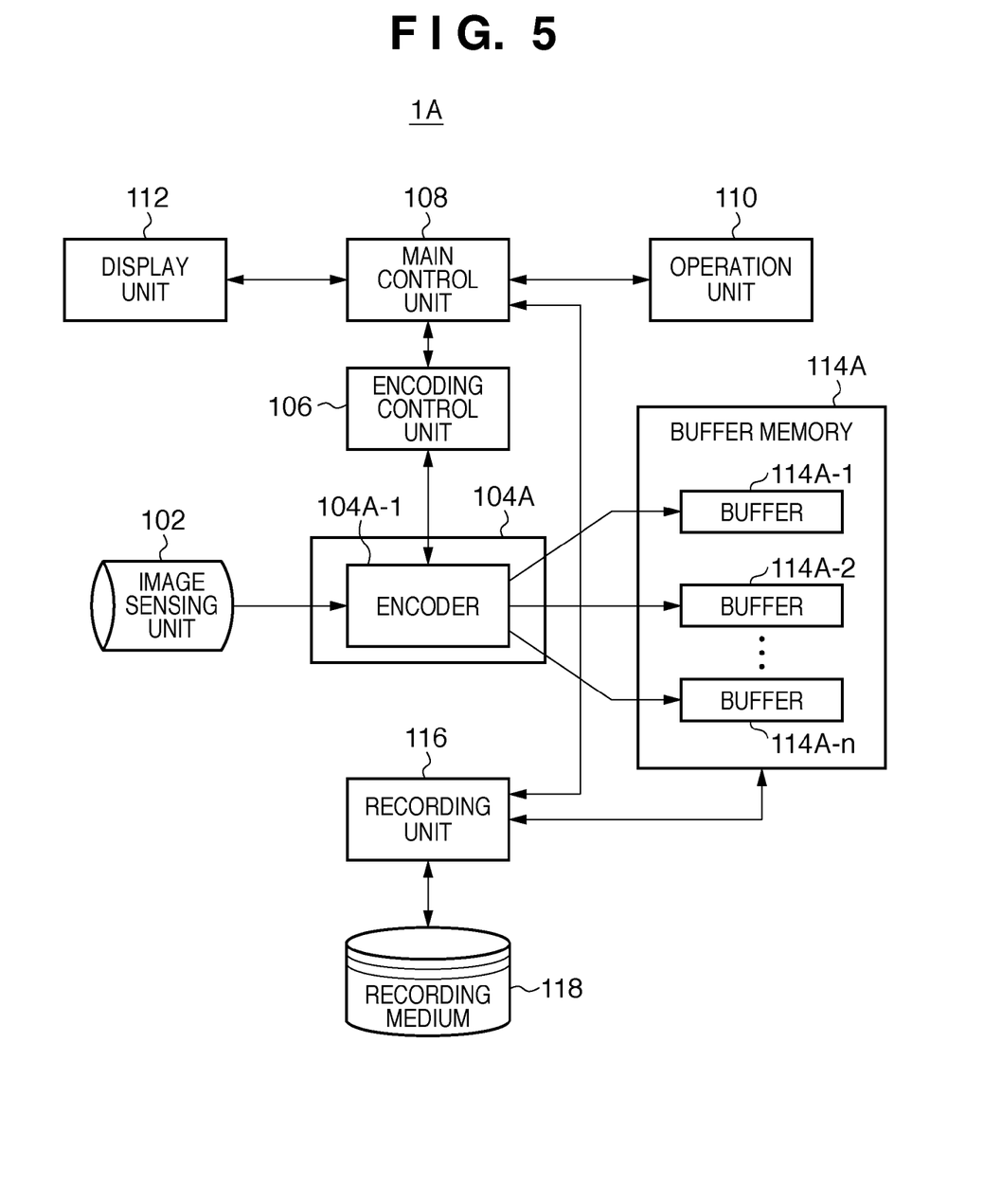
FIG. 5 is a schematic block diagram showing the configuration of an image sensing apparatus according to a second embodiment of the present invention.

FIG. 5 is a schematic block diagram showing the configuration of an image sensing apparatus 1A according to a second embodiment of the present invention. The image sensing apparatus 1A is an image sensing apparatus that converts a video of an object into stream data, records the stream data on a recording medium, and reproduces the video recorded on the recording medium, similar to the image sensing apparatus 1. Further, with the image sensing apparatus 1A, selection between the normal recording mode and the fixed time recording mode is possible.

As shown in FIG. 5, although the image sensing apparatus 1A has a similar configuration to that of the image sensing apparatus 1, the configurations of an encoding unit 104A and a buffer memory 114A differ.

The encoding unit 104A converts a video signal input from the image sensing unit 102 so as to generate stream data, and stores this stream data in the buffer memory 114A. Further, under the control of the encoding control unit 106, the encoding unit 104A can independently control saving of stream data in a plurality of buffers 114A-1 to 114A-n included in the buffer memory 114A. The encoding unit 104A is constituted from an encoder 104A-1 that performs a converting process for converting a video into stream data in the present embodiment. The encoder 104A-1 is controlled by the encoding control unit 106, and converts a video signal input from the image sensing unit 102 into stream data in a predetermined format.

The buffer memory 114A is a memory that temporarily stores stream data generated by the encoding unit 104A (the encoder 104A-1). In the present embodiment, the buffer memory 114 includes a plurality of buffers 114A-1, 114A-2, . . . , 114A-n that store stream data. The plurality of buffers 114A-1 to 114A-n each independently stores stream data from the encoding unit 104A. The state of each of the buffers 114A-1 to 114A-n is regularly monitored by the recording unit 116, and pieces of stream data stored in the buffer memory 114A-1 to 114A-n are independently recorded on the recording medium 118 via the recording unit 116.

Note that in the image sensing apparatus 1A shown in FIG. 5, some or all of the encoding unit 104A, the encoding control unit 106, the main control unit 108, and the recording unit 116 may be realized as a program on a CPU mounted in the image sensing apparatus 1A.

Here, with the image sensing apparatus 1A, while the fixed time recording mode is selected, there are cases in which a second instruction to start recording is issued before a fixed time elapses after a first instruction to start recording was issued. In such a case, the encoding control unit 106 and the main control unit 108 control the encoding unit 104A to independently store, in the buffer memory 114A, pieces of stream data that last for a fixed time corresponding to each of the first instruction to start recording and the second instruction to start recording. Specifically, the encoding control unit 106 and the main control unit 108 control the encoding unit 104A such that pieces of stream data that last for a fixed time corresponding to each of the first instruction to start recording and the second instruction to start recording are independently stored in a different buffer of the plurality of buffers. That is, the encoding control unit 106 and the main control unit 108 control the saving timing at which the encoding unit 104A stores data in the plurality of buffers 114A-1 to 114A-n. Then, the recording unit 116 records, on the recording medium 118, each piece of stream data independently stored in the plurality of buffers 114A-1 to 114A-n.

Figure 6:
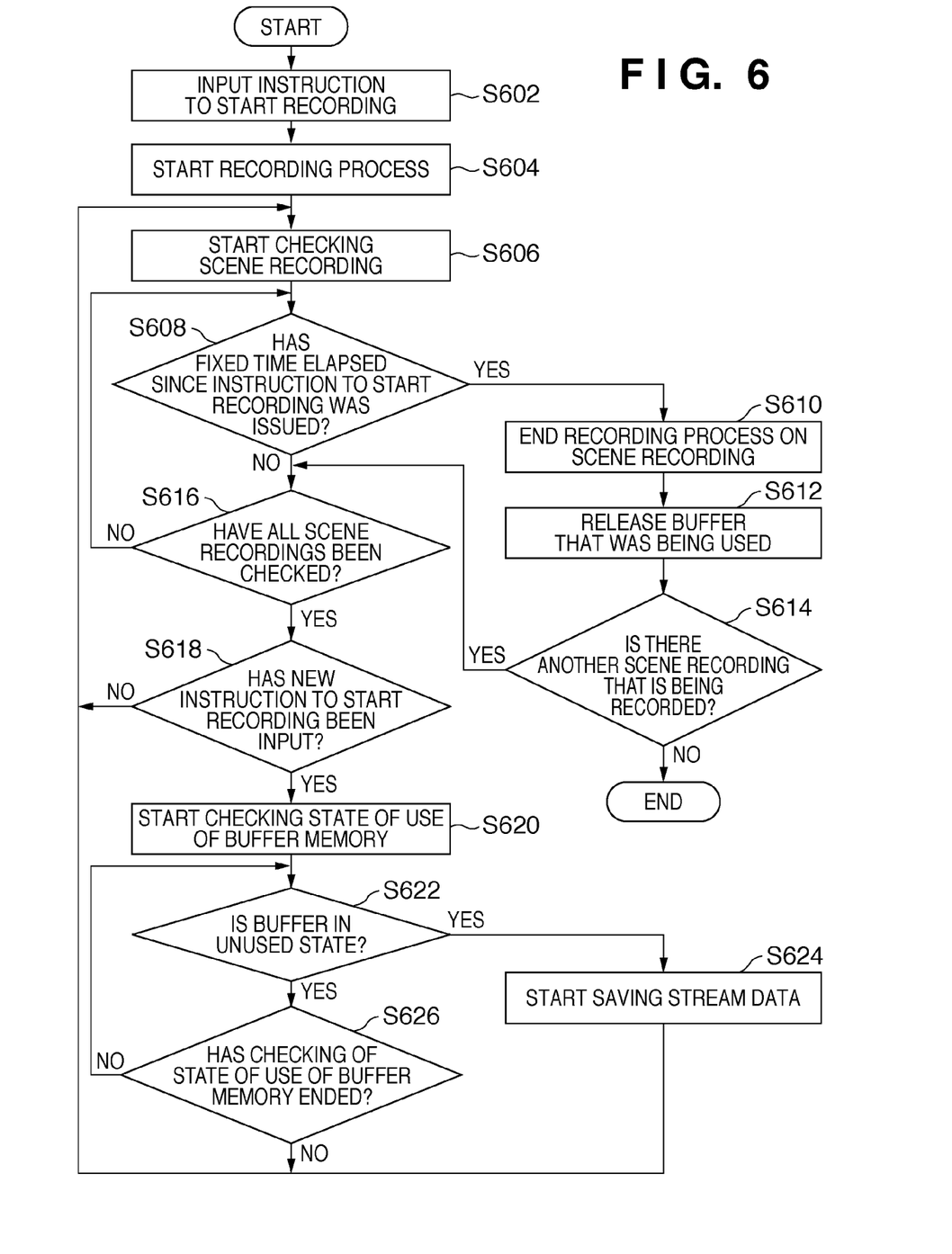
FIG. 6 is a flow chart for illustrating an operation performed by the image sensing apparatus shown in FIG. 5 in the fixed time recording mode.

Hereinafter, operations performed by the image sensing apparatus 1A are described with reference to FIG. 6. Here, an operation in the fixed time recording mode is described from among the entire operations performed by the image sensing apparatus 1A. This operation is executed by the fixed time recording mode being selected as a recording mode of the image sensing apparatus 1A, and the main control unit 108 performing overall control of each unit of the image sensing apparatus 1A.

In step S602, the operation unit 110 receives an instruction to start recording from the user, and this instruction to start recording is input into the main control unit 108 via the operation unit 110.

In step S604, the main control unit 108 causes the encoding unit 104A (the encoder 104A-1) to start a recording process via the encoding control unit 106 in response to the instruction to start recording from the user. Specifically, the main control unit 108 issues an instruction to the encoder 104A-1 to perform a converting process for converting a video signal input from the image sensing unit 102 into stream data. Note that the main control unit 108 issues an instruction to store the stream data converted (generated) by the encoder 104A-1 in the first buffer 114A-1 of the buffer memory 114A.

In step S606, the main control unit 108 starts checking a scene recording that is being currently recorded in response to the instruction to start recording from the user. At this time, the main control unit 108 starts checking from a scene recording for which the instruction to start recording was issued at the earliest time. Note that only one scene recording is recorded at the stage when an instruction to start recording has been issued in a state in which an instruction to start recording was not issued (that is, recording was stopped).

In step S608, the main control unit 108 determines whether a fixed time has elapsed since the instruction to start recording was issued for the scene recording targeted for checking. If the fixed time has not elapsed since the instruction to start recording was issued, checking of a scene recording targeted for checking ends, and the processing proceeds to step S616. On the other hand, if the fixed time has elapsed since the instruction to start recording was issued, the processing proceeds to step S610.

In step S610, the main control unit 108 ends a recording process on the scene recording targeted for checking. Specifically, the main control unit 108 issues an instruction to stop saving stream data corresponding to the scene recording targeted for checking to the buffer memory 114A, via the encoding control unit 106. Then, the main control unit 108 issues an instruction to the recording unit 116 to record stream data of the scene recording targeted for checking stored in the buffer memory 114A, on the recording medium 118.

In step S612, the main control unit 108 releases the buffer of the buffer memory 114A that was being used for the scene recording targeted for checking and puts the buffer into an unused state, via the encoding control unit 106. Here, release of the buffer of the buffer memory 114A is to stop saving stream data by the encoding unit 104A to this buffer.

In step S614, the main control unit 108 determines whether there is another scene recording that is being currently recorded. If there is no other scene recording that is being currently recorded, all the scene recordings have ended and, thus, the operation ends. On the other hand, if there is another scene recording that is being currently recorded, the processing proceeds to step S616 in order to continue checking other scene recordings.

In step S616, the main control unit 108 determines whether all the scene recordings that are being currently recorded have been checked. As described above, since scene recordings are checked from the scene recording for which the instruction to start recording was issued at the earliest time and, thus, it is sufficient that the main control unit 108 determines whether the scene recording for which the instruction to start recording was issued at the latest time has been checked. If all the scene recordings have not been checked, the processing returns to step S608 in order to check the next scene recording. On the other hand, if all the scene recordings have been checked, the processing proceeds to step S618.

In step S618, the main control unit 108 determines whether the operation unit 110 has received a new instruction to start recording from the user, and the new instruction to start recording has been input. If a new instruction to start recording is not input, the processing returns to step S606, and checking of a scene recording that is being currently recorded is started. If a new instruction to start recording has been input, the processing proceeds to step S620.

In step S620, the main control unit 108 starts checking the state of use of the buffer memory 114A via the encoding control unit 106. Here, checking of the state of use of the buffer memory 114A is to check whether stream data is stored in each of the buffers 114A-1 to 114A-n by the encoding unit 104A. Note that the buffers are checked in order from the first buffer 114A-1 that constitutes the buffer memory 114A.

In step S622, the main control unit 108 determines whether the buffer targeted for checking is in an unused state (or is in a used state). If the buffer targeted for checking is in an unused state, the processing proceeds to step S624. On the other hand, if the buffer targeted for checking is not in an unused state (that is, in a used state), checking of the buffer targeted for checking ends, and the processing proceeds to step S626.

In step S624, via the encoding control unit 106, the main control unit 108 starts saving stream data in the buffer determined as being in an unused state in step S622. Specifically, the main control unit 108 issues an instruction to the encoding unit 104A (the encoder 104A-1) to store stream data in the buffer determined as being in an unused state in step S622. In other words, the encoding unit 104A also stores stream data generated at the time of receiving an instruction from the main control unit 108, in the buffer determined as being in an unused state in step S622, in addition to the buffer that is currently storing stream data. Accordingly, stream data that lasts for the fixed time corresponding to a new instruction to start recording will be stored in the buffer memory 114A. Note that after starting to store stream data in the buffer determined as being in an unused state in step S622, the processing returns to step S606 in order to start checking the scene recording.

In step S626, the main control unit 108 determines whether checking of the state of use of the buffer memory 114A has ended (that is, whether checking of all the buffers of the buffer memory 114A has been performed to determine if a buffer is in an unused state). If checking of the state of use of the buffer memory 114A has not ended, the processing returns to step S622 in order to check the next buffer. On the other hand, if checking of the state of use of the buffer memory 114A has ended, the processing returns to step S606, and checking of a scene recording that is being currently recorded is started. At this time, the main control unit 108 may cancel a new instruction to start recording input from the operation unit 110, and may cause the display unit 112 to display a message indicating that a recording could not be started. This enables the user to know that a recording process corresponding to the new instruction to start recording is not performed since all the buffers of the buffer memory 114A were in a used state. Also, the main control unit 108 may suspend a new instruction to start recording until it is determined whether a next instruction to start recording has been input (step S618). Accordingly, after checking of a scene recording has ended, checking of the state of use of the buffer memory 114A will be started again, and a recording process can be automatically started if any one of the buffers enters an unused state.

Further, after ending all the recording processes corresponding to instructions to start recording, the main control unit 108 may display, on the display unit 112, a list of a plurality of pieces of stream data recorded on the recording medium 118 in a selectable manner, and may delete stream data selected by the user.

In this way, according to the image sensing apparatus 1A, even if a new instruction to start recording is issued before a fixed time has elapsed since an instruction to start recording was issued in the fixed time recording mode, it is possible to independently record videos that last for a fixed period corresponding to each instruction to start recording. Further, the image sensing apparatus 1A can realize a similar effect to that of the image sensing apparatus 1 using one encoder, which is effective in suppressing an increase in circuit structure or cost.

Third Embodiment

Figure 7:
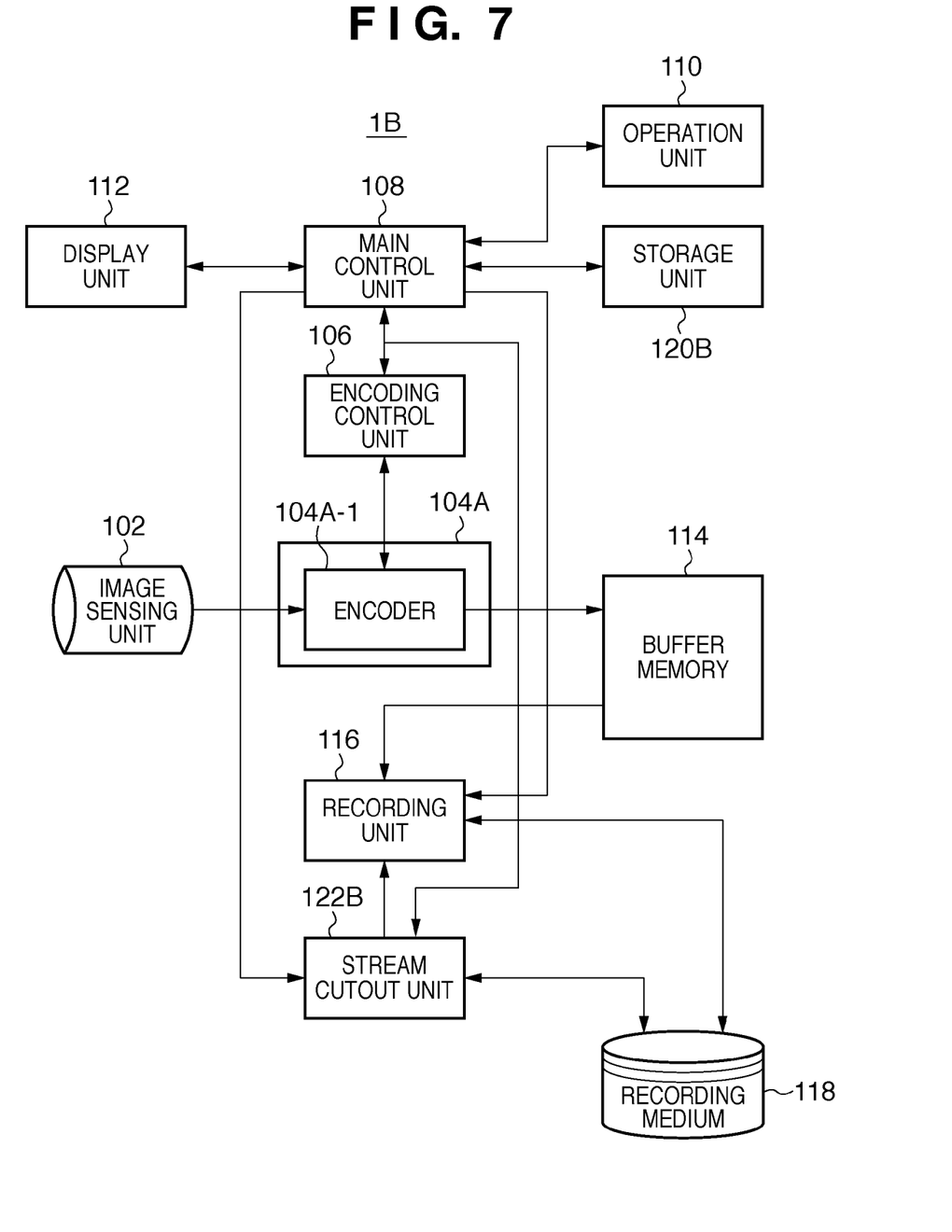
FIG. 7 is a schematic block diagram showing the configuration of an image sensing apparatus according to a third embodiment of the present invention.

FIG. 7 is a schematic block diagram showing the configuration of an image sensing apparatus 1B according to a third embodiment of the present invention. The image sensing apparatus 1B is an image sensing apparatus that converts a video of an object into stream data, records the stream data on a recording medium, and reproduces the video recorded on the recording medium, similar to the image sensing apparatus 1 and the image sensing apparatus 1A. Further, with the image sensing apparatus 1B, selection between a normal recording mode and a fixed time recording mode is possible.

As shown in FIG. 7, the image sensing apparatus 1B has a similar configuration to that of the image sensing apparatus 1 or the image sensing apparatus 1A, and is further provided with a storage unit 120B and a stream cutout unit 122B.

The storage unit 120B is constituted from, for example, a RAM or the like, and stores the time when the operation unit 110 inputs an instruction to start recording from the user into the main control unit 108, that is, the time when an instruction to start recording was issued, in the fixed time recording mode. Note that the time when an instruction to start recording was issued is input into the storage unit 120B via the main control unit 108.

Under the control of the main control unit 108, the stream cutout unit 122B reads out stream data recorded on the recording medium 118, and cuts out the stream data from an arbitrary starting position to an arbitrary end position as new stream data. Note that the stream data cut out by the stream cutout unit 122B is recorded on the recording medium 118 via the recording unit 116.

Note that in the image sensing apparatus 1B shown in FIG. 7, some or all of the encoding unit 104A, the encoding control unit 106, the main control unit 108, the recording unit 116, and the stream cutout unit 122B may be realized as a program on a CPU mounted in the image sensing apparatus 1B.

Here, with the image sensing apparatus 1B, while the fixed time recording mode is selected, there are cases in which a second instruction to start recording is issued before a fixed time elapses since a first instruction to start recording was issued. In such a case, the main control unit 108 causes the storage unit 120B to store the time when the first instruction to start recording was issued (first time), and the time when the second instruction to start recording was issued (second time). Further, the main control unit 108 controls the stream cutout unit 122B to cut out, from stream data recorded on the recording medium 118, stream data that lasts for a fixed time from the first time, and stream data that lasts for a fixed time from the second time, respectively. Then, the main control unit 108 causes the recording unit 116 to independently record, on the recording medium 118, each piece of stream data cut out by the stream cutout unit 122B as stream data corresponding to the first instruction to start recording and the second instruction to start recording, respectively.

Figure 8:
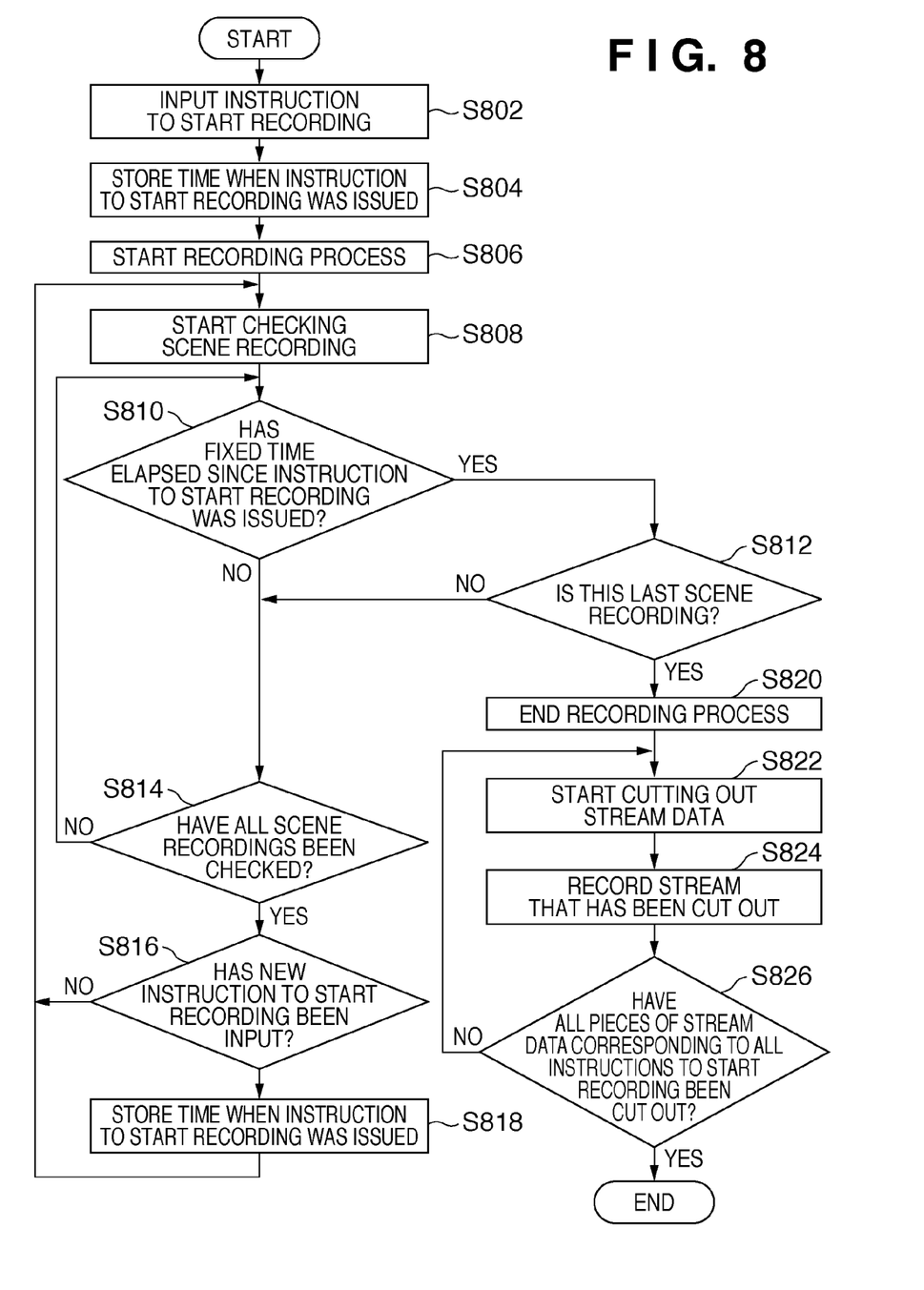
FIG. 8 is a flow chart for illustrating an operation performed by the image sensing apparatus shown in FIG. 7 in the fixed time recording mode.

Hereinafter, operations performed by the image sensing apparatus 1B are described with reference to FIG. 8. Here, an operation in the fixed time recording mode is described from among the entire operations performed by the image sensing apparatus 1B. This operation is executed by the fixed time recording mode being selected as a recording mode of the image sensing apparatus 1B, and the main control unit 108 performing overall control of each unit of the image sensing apparatus 1B.

In step S802, the operation unit 110 receives an instruction to start recording from the user, and this instruction to start recording is input into the main control unit 108 via the operation unit 110.

In step S804, the main control unit 108 causes the storage unit 120B to store the time when an instruction to start recording was input in step S802, that is, the time when the start of recording was issued as an instruction. However, step S804 is performed almost simultaneously with step S806 described later.

In step S806, the main control unit 108 causes the encoding unit 104A to start a recording process via the encoding control unit 106 in response to the instruction to start recording from the user. Specifically, the main control unit 108 issues an instruction to the encoder 104A-1 of the encoding unit 104A to perform a converting process for converting a video signal input from the image sensing unit 102 into stream data. Note that stream data converted by the encoding unit 104A is successively stored in the buffer memory 114.

In step S808, the main control unit 108 starts checking a scene recording that is being currently recorded in response to the instruction to start recording from the user. At this time, the main control unit 108 starts checking from a scene recording for which the instruction to start recording was issued at the earliest time. Note that only one scene recording is recorded at the stage when an instruction to start recording has been issued in a state in which an instruction to start recording was not issued (that is, recording was stopped).

In step S810, the main control unit 108 determines whether a fixed time has elapsed since the instruction to start recording was issued for the scene recording targeted for checking. If the fixed time has not elapsed since the instruction to start recording was issued, checking of a scene recording targeted for checking ends, and the processing proceeds to step S814. On the other hand, if the fixed time has elapsed since the instruction to start recording was issued, the processing proceeds to step S812.

In step S812, the main control unit 108 determines whether the scene recording targeted for checking is the last scene recording. If the scene recording targeted for checking is the last scene recording, the processing proceeds to step S820 in order to end a recording process. On the other hand, if the scene recording targeted for checking is not the last scene recording, the processing proceeds to step S814.

In step S814, the main control unit 108 determines whether all the scene recordings that are being currently recorded have been checked. As described above, since scene recordings are checked from the scene recording for which the instruction to start recording was issued at the earliest time and, thus, it is sufficient that the main control unit 108 determines whether the scene recording for which the instruction to start recording was issued at the latest time has been checked. If all the scene recordings have not been checked, the processing returns to step S810 in order to check the next scene recording. On the other hand, if all the scene recordings have been checked, the processing proceeds to step S816.

In step S816, the main control unit 108 determines whether the operation unit 110 has received a new instruction to start recording from the user, and whether the new instruction to start recording has been input. If a new instruction to start recording is not input, the processing returns to step S808, and checking of a scene recording that is being currently recorded is started. If a new instruction to start recording has been input, the processing proceeds to step S818.

In step S818, the main control unit 108 causes the storage unit 120B to store the time when a new instruction to start recording was input, that is, the time when a new instruction to start recording was issued. Note that after the storage unit 120B is caused to store the time when a new instruction to start recording was issued, the processing returns to step S808 in order to start checking a scene recording.

In step S820, the main control unit 108 ends a recording process. Specifically, the main control unit 108 issues an instruction to the encoding unit 104A (the encoder 104A-1) to stop a converting process, via the encoding control unit 106.

In step S822, the main control unit 108 starts cutting out stream data recorded on the recording medium 118 via the stream cutout unit 122B. Specifically, the main control unit 108 issues an instruction to the stream cutout unit 122B to sequentially cut out stream data that lasts for a fixed time from the first time (earliest time) of the times when instructions to start recording were issued stored in the storage unit 120B. Note that the stream cut out by the stream cutout unit 122B is input into the recording unit 116.

In step S824, the main control unit 108 records the stream cut out by the stream cutout unit 122B on the recording medium 118 via the recording unit 116. Specifically, the main control unit 108 issues an instruction to the recording unit 116 to record, on the recording medium 118, each of the streams cut out by the stream cutout unit 122B as stream data that lasts for the fixed time corresponding to each instruction to start recording. Accordingly, pieces of stream data that last for the fixed time corresponding to each of a plurality of instructions to start recording are recorded on the recording medium 118.

In step S826, the main control unit 108 determines whether pieces of stream data corresponding to all the instructions to start recording have been cut out (that is, whether pieces of stream data that last for the fixed time have been cut out for all the times stored in the storage unit 120B). If the pieces of stream data corresponding to all the instructions to start recording have not been cut out, the processing returns to step S822, and cutting out of stream data is continued. On the other hand, the operation ends if the pieces of stream data corresponding to all the instructions to start recording have been cut out.

Note that, after ending all the recording processes corresponding to instructions to start recording, the main control unit 108 may display, on the display unit 112, a list of a plurality of pieces of stream data recorded on the recording medium 118 in a selectable manner, and may delete stream data selected by the user.

Figure 9:
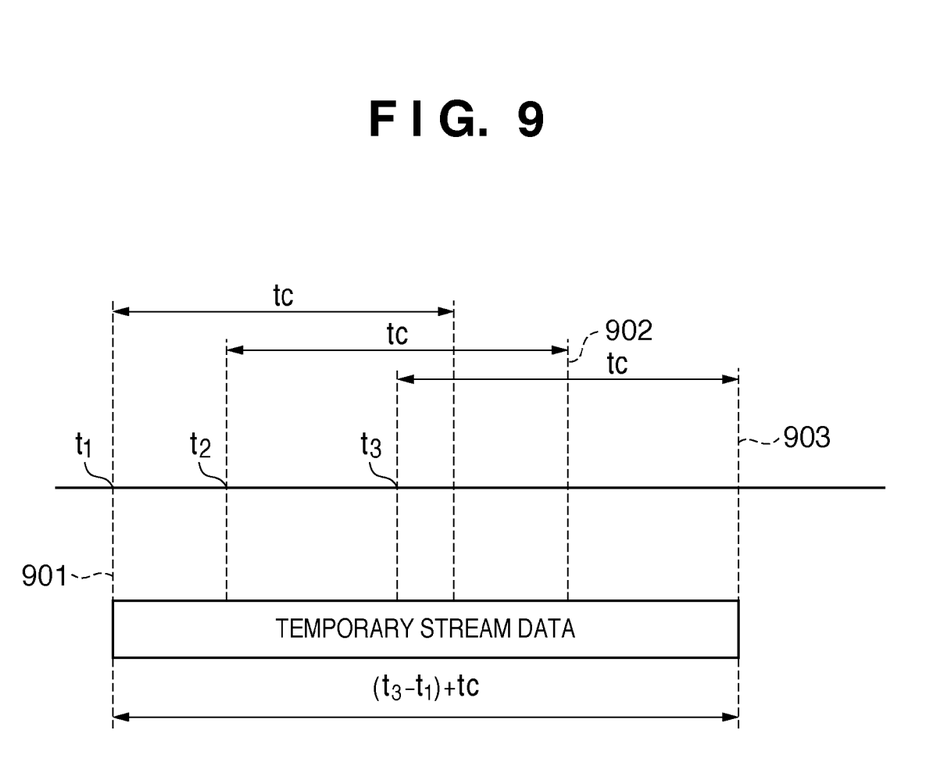
FIG. 9 is a timing chart showing recording states of pieces of stream data corresponding to each instruction to start recording if a plurality of instructions to start recording are issued before a fixed time has elapsed since an arbitrary instruction to start recording was issued in the fixed time recording mode of the image sensing apparatus shown in FIG. 7.

FIG. 9 is a timing chart showing the recording states of pieces of stream data corresponding to each instruction to start recording if a plurality of instructions to start recording are issued before a fixed time elapses since an arbitrary instruction to start recording was issued, in the fixed time recording mode of the image sensing apparatus 1B.

Referring to FIG. 9, if an instruction to start recording from the user is input at a time t1 in a state in which a scene recording is not being recorded, the encoding unit 104A (the encoder 104A-1) performs a converting process. The stream data converted (generated) by the encoder 104A-1 is held as temporary stream data in the buffer memory 114, and is recorded on the recording medium 118 via the recording unit 116. Note that if a new instruction to start recording is not issued until a fixed time tc has elapsed after the time t1, the main control unit 108 ends a converting process performed by the encoder 104A-1 after the fixed time tc has elapsed after the time t1.

Then, if a new instruction to start recording from the user is input at a time t2 between the time t1 and a time t1+tc, the main control unit 108 extends the time when the converting process performed by the encoder 104A-1 ends to a time t2+tc. Note that if a new instruction to start recording is not issued until the fixed time tc has elapsed after the time t2, the main control unit 108 ends the converting process performed by the encoder 104A-1 after the fixed time tc elapses after the time t2. In this way, if a new instruction to start recording is issued before the fixed time tc elapses and after the last instruction to start recording was issued, the time when the converting process performed by the encoder 104A-1 ends is updated.

Furthermore, if a new instruction to start recording from the user is input at a time t3 between the time t2 and a time t2+tc, the main control unit 108 extends the time when the converting process performed by the encoder 104A-1 ends to a time t3+tc. Then, the stream data that lasts for the fixed time tc is cut out for the time t1 from the temporary stream data recorded on the recording medium 118, and the cut-out data is used as stream data 901 corresponding to the instruction to start recording issued at the time t1. Similarly, pieces of stream data that last for the fixed time tc are cut out for the times t2 and t3, respectively, from the temporary stream data recorded on the recording medium 118, and the pieces of cut-out data are used as stream data 902 and 903 corresponding to instructions to start recording issued at the times t2 and t3, respectively.

In this way, according to the image sensing apparatus 1B, even if a new instruction to start recording is issued before a fixed time has elapsed since an instruction to start recording was issued in the fixed time recording mode, it is possible to independently record videos that last for a fixed period corresponding to each instruction to start recording. Furthermore, the image sensing apparatus 1B can realize the similar effect to that of the image sensing apparatus 1 or the image sensing apparatus 1A using one encoder and one buffer memory, which is even more effective in suppressing an increase in circuit structure or cost.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent application No. 2008-317707 filed on Dec. 12, 2008, which is hereby incorporated by reference herein in its entirety.

The invention claimed is:

1. An image sensing apparatus, comprising:
an encoding unit configured to convert video from an image sensing unit so as to generate stream data;
a recording unit configured to record the stream data generated by the encoding unit on a recording medium;
a storage unit configured to store, in a case where, in a fixed time recording mode for recording for a fixed time in response to an instruction to start recording, a second instruction to start recording is issued by a user before the fixed time has elapsed since a first instruction to start recording was issued by a user, a time when the first instruction to start recording was issued and a time when the second instruction to start recording was issued; and
a control unit configured, after recordings in response to the first instruction to start recording, and the second instruction to start recording have ended, to cut out stream data that lasts for the fixed time from the time when the first instruction to start recording was issued stored in the storage unit and stream data that lasts for the fixed time from the time when the second instruction to start recording was issued stored in the storage unit, respectively, from the stream data recorded on the recording medium, and to cause the recording unit to record the cut-out stream data as the stream data that lasts for the fixed time corresponding to the first instruction to start recording, and the stream data that lasts for the fixed time corresponding to the second instruction to start recording, on the recording medium.

2. The image sensing apparatus according to claim 1, further comprising a display unit configured to display a list of a plurality of pieces of stream data recorded on the recording medium so that a user can select therefrom,
wherein the recording unit deletes, from the recording medium, stream data selected by the user from among the plurality of pieces of stream data displayed in the list on the display unit.

3. A method for controlling an image sensing apparatus comprising an encoding unit configured to convert video from an image sensing unit so as to generate stream data, and a recording unit configured to record the stream data generated by the encoding unit on a recording medium, the method comprising:
a storage step of storing, in a case where, in a fixed time recording mode for recording for a fixed time in response to an instruction to start recording, a second instruction to start recording is issued by a user before the fixed time has elapsed since a first instruction to start recording was issued by a user, a time when the first instruction to start recording was issued and a time when the second instruction to start recording was issued; and
a control step of, after recordings in response to the first instruction to start recording, and the second instruction to start recording have ended, cutting out stream data that lasts for the fixed time from the time when the first instruction to start recording was issued stored in the storage step and stream data that lasts for the fixed time from the time when the second instruction to start recording was issued stored in the storage step, respectively, from the stream data recorded on the recording medium, and causing the recording unit to record the cut-out stream data as the stream data that lasts for the fixed time corresponding to the first instruction to start recording, and the stream data that lasts for the fixed time corresponding to the second instruction to start recording, on the recording medium.

4. An image sensing apparatus, comprising:
an encoding unit configured to convert video from an image sensing unit so as to generate stream data;
a recording unit configured to record the stream data generated by the encoding unit on a recording medium;
a storage unit configured to store, in a case where, in a fixed time recording mode for recording for a fixed time in response to an instruction to start recording, a second instruction to start recording is issued by a user before the fixed time has elapsed since a first instruction to start recording was issued by a user, a time when the first instruction to start recording was issued and a time when the second instruction to start recording was issued; and
a control unit configured, after recordings in response to the first instruction to start recording, and the second instruction to start recording have ended, to cut out stream data that lasts for the fixed time from the time when the first instruction to start recording was issued stored in the storage unit and stream data that lasts for the fixed time from the time when the second instruction to start recording was issued stored in the storage unit, respectively, from the stream data recorded on the recording medium, and to cause the recording unit to record the cut-out stream data on the recording medium.

5. A method for controlling an image sensing apparatus comprising an encoding unit configured to convert video from an image sensing unit so as to generate stream data, and a recording unit configured to record the stream data generated by the encoding unit on a recording medium, the method comprising:
a storage step of storing, in a case where, in a fixed time recording mode for recording for a fixed time in response to an instruction to start recording, a second instruction to start recording is issued by a user before the fixed time has elapsed since a first instruction to start recording was issued by a user, a time when the first instruction to start recording was issued and a time when the second instruction to start recording was issued; and
a control step of, after recordings in response to the first instruction to start recording, and the second instruction to start recording have ended, cutting out stream data that lasts for the fixed time from the time when the first instruction to start recording was issued stored in the storage step and stream data that lasts for the fixed time from the time when the second instruction to start recording was issued stored in the storage step, respectively, from the stream data recorded on the recording medium, and causing the recording unit to record the cut-out stream data on the recording medium.

* * * * *